United States Patent [19]

Stephan et al.

[11] 3,876,803

[45] Apr. 8, 1975

[54] GELLED PROTEINACEOUS FISH BAIT HAVING CROSS-LINKED EXTERIOR AND WATER-SOLUBLE INTERIOR

[76] Inventors: John Thomas Stephan; Kurt Frederick Stephan, both of 1318 W. Kessler Blvd., Longview, Wash. 98632

[22] Filed: July 26, 1972

[21] Appl. No.: 275,148

Related U.S. Application Data

[63] Continuation of Ser. No. 40,722, May 26, 1970, abandoned.

[52] U.S. Cl. .................. 426/1; 426/92; 426/168; 426/212; 426/350; 426/364; 117/118
[51] Int. Cl. .............................................. A23k 1/18
[58] Field of Search ............ 99/3, 2 R, 14, 18, 111, 99/114; 424/84; 117/118, 62.2, 62.1; 426/1, 89, 92, 167, 168, 212, 350, 364

[56] References Cited
UNITED STATES PATENTS

| | | | |
|---|---|---|---|
| 1,366,380 | 1/1921 | Grinnell | 117/62.2 |
| 2,578,943 | 12/1951 | Palermo et al | 117/118 |
| 2,693,417 | 11/1954 | Orth, Jr. | 99/3 |
| 2,951,761 | 9/1960 | Stephan | 99/3 |
| 3,228,789 | 1/1966 | Glassman | 117/62.2 |
| 3,421,899 | 1/1969 | Humphreys | 99/3 |
| 3,437,488 | 4/1969 | Humphreys | 99/3 |
| 3,499,379 | 3/1970 | Nesmeyanov et al | 99/3 X |
| 3,589,910 | 6/1971 | Nesmeyanov et al | 99/14 |

*Primary Examiner*—A. Louis Monacell
*Assistant Examiner*—Curtis C. Ribando
*Attorney, Agent, or Firm*—Christensen, O'Connor, Garrison & Havelka

[57] ABSTRACT

A fish bait and method of production thereof wherein a non-homogeneous body having a toughened exterior skin-like structure surrounding a gelatinous body is formed by mixing a gel-forming proteinaceous material and water at a temperature above the solgel transition temperature, forming the proteinaceous mass into the desired shape, cooling the shaped mass and treating the exterior surface of the shaped mass with a tanning agent such as formaldehyde, resulting in a relatively insoluble skin surrounding a relatively soluble gel structure. Humectants may be added to alter the gel characteristics and fish egg waste material and other cannery wastes may be utilized as part or all of the proteinaceous material to provide the characteristic odor associated with salmon eggs.

23 Claims, No Drawings

GELLED PROTEINACEOUS FISH BAIT HAVING CROSS-LINKED EXTERIOR AND WATER-SOLUBLE INTERIOR

This is a continuation of application Ser. No. 40,722, filed May 26, 1970, now abandoned.

This invention relates to a process and composition of matter for the production of fish bait.

The art of manufacturing fish bait to catch trout, bass, catfish, etc. is obviously quite old. Many types of edible fish bait are known. Of the edible bait materials, the most widely and successfully used bait for trout fishing are angleworms, nightcrawlers, salmon eggs, and the like. The natural supply of these baits is limited as compared to the expanding population of fishermen and the multiplying number of public recreation areas well stocked with fish. Of the edible baits, salmon eggs are by far the one used to the greatest extent by fishermen and have in the past been readily available in suitable quantities so as to make the preparation of salmon egg bait through hardening, preservation and packing commercially feasible. Unfortunately the supply of salmon eggs in recent years has been quite variable due to the generally declining yield of fish over the years and the increased competition for the salmon roe, which is used to make red caviar, a food delicacy in great demand. There exists therefore a demand for a manufactured salmon egg prepared from readily available raw material not used as foodstuffs for humans.

The salmon eggs as removed in preparation for canning the salmon occur in skeins from which they must be separated. At this stage and prior to hardening, the salmon egg is very soft and delicate and is not capable of hanging very long on a fish hook during casting or when subject to the hydraulic forces in being dragged through a river or stream. The presently used commercial hardening process for salmon eggs involves treating the whole single egg with formaldehyde and heat. The formaldehyde combines with the protein of the salmon egg to harden it. This very considerably toughens the skin as compared with the more fluid material enclosed by the skin and the result is a rather spherical shaped egg. Proper treatment of salmon eggs with formaldehyde and heat gives an opaque, slightly pink spherical product about six millimeters in diameter having a consistency somewhat like a weak art gum rubber such that a single egg may be strung onto a fish hook and remain there during one or more casts and subsequent drag through the water. A description of the processing of natural salmon eggs to preserve and enlarge them is found in U.S. Pat. No. 2,951,761, U.S. Pat. No. 2,743,185 and U.S. Pat. No. 1,703,324. While the supply of natural salmon eggs suitable for preserving is limited, there is a quantity of small salmon eggs, crushed salmon eggs with skeins, milt and other proteinaceous fish offal which may be utilized for fish bait manufacture if a suitable process were devised to make use of the materials which are by-products of the fish canning industry.

One prior art process which produces a synthetic fish bait utilizes a proteinaceous material in the form of a gel which has a hardening agent incorporated in the gel prior to forming the bait into its finished shape. After a short curing time, a homogeneous fish bait is produced which resembles a salmon egg to a certain extent; however, due to the homogeneity of the product so formed, does not have the natural appearance and feel of a salmon egg product well known to the fishing industry. Rather, the homogeneous fish bait thus formed has the consistency of a gum eraser throughout and provides less than the desired amount of solubility in cold water to act as an attractant to fish. One problem with this prior art process and product is that natural fish products are not utilized in its preparation. Rather it is animal or other gelatinous material and therefore does not give off the characteristic odor of salmon eggs when placed in water for attracting fish. No provision is made for the utilization of byproducts of the fish canning industry in the prior art process. Another problem presented by this prior art process is that only a relatively short time is available in which to work the gel mixture after adding the hardening agent before the gel is permanently set.

It is an object of this invention to provide a fish bait and a method of preparation thereof which has the form of a natural bait and closely resembles the natural bait in shape, color, consistency and odor. A further object of this invention is to provide a nonhomogeneous synthetic salmon egg which has a distinct skin of suitable toughness to be retained on a fishhook while subjected to the normal forces of casting and dragging through the water.

A still further object is to provide a new fish bait in the form of a salmon or other fish egg having improved characteristics.

The present invention describes a fish bait and the method of preparing this fish bait in the form of salmon eggs which are remarkably like the natural salmon egg in shape, color, consistency, odor, and have a distinct skin of suitable toughness to be retained on a fish hook while subject to the normal forces of casting and dragging through water. It is very important to have a sufficiently tough skin. If there is no skin and the manufactured salmon egg has the same consistency throughout from one side to the other, there is a tendency to split or crack when the fish hook is inserted. On the other hand a manufactured salmon egg of our invention has a skin which is readily punctured by the fish hook without splitting or cracking. Such a skin holds the material of the interior of the egg and allows it to leach or exude through the puncture made by the fish hook in the same fashion as the preserved natural salmon egg. Thus the action of our manufactured egg during the dragging of the baited hook through fishing waters provides an attraction for the trout and similar game fish in a similar fashion to preserved natural salmon eggs. Particularly in lake fishing it is important to have a salmon egg which has a skin tough enough to enable it to stay on the hook but the interior of the egg must be soft enough to be readily deformed by the jaws of the fish taking the bait. The fish instinctively knows the consistency of a natural fertilized salmon egg. Trout have been known to spit out preserved natural salmon eggs which have been hardened to a consistency like a hard rubber ball. A hard inelastic ball-shaped bait covering a hook may actually prevent the contained hook from being set into the flesh in the mouth of the game fish. The importance of the skin is such that careful attention must be given during processing according to our invention.

The method of the present invention comprises the following processing steps: A proteinaceous material which forms a thermally reversible gel in a water solution or mixture is prepared for this process by mixing with water at a temperature in excess of the sol-gel transition temperature. Bait-sized globules constituting individual shaped elements are then formed from the mass of proteinaceous sol and then cooled below the sol-gel transition temperature to form gelled shaped elements. The surface of these elements is then treated with a curing or tanning agent such as formaldehyde to cross link the gel forming the exterior into a relatively water-insoluble skin-like material having an increased sol-gel transition temperature. The tanning process is continued until a thin skin surrounding the main bulk of the gelled shaped elements is cross-linked. The resultant product may then be packed by known techniques into hermetically sealed containers and sold through the usual channels as fish bait.

As a suitable material for our salmon egg process we use a water soluble or dispersible protein capable of giving a thermally reversible solution or dispersion which will undergo gelation upon chilling and which is capable of reacting while in the chilled gel form with a tanning agent such as formaldehyde to give a tanned gelskin which is thermally irreversible, thus making the individual eggs resistant to melting at elevated storage temperatures. It is an essential part of this invention that the thermally reversible protein solution is formed into jelled spheres and these spheres are then tanned with a suitable tanning agent such as a reactive aldehyde which renders the protein insoluble in the solvent and elevates the sol-gel transition temperature. The sol-gel transition temperature must be higher than any temperature to which the bait may be subjected after manufacture and during storage or use. If a bait is heated say during storage to a temperature higher than the sol-gel transition temperature of the bait, it will, of course, melt and destroy the spherical shape of the bait. In a jar, for example, this could result in one useless blob at the bottom. In carrying out laboratory tests, a temperature of 140° F. is taken as the highest temperature to which bait would be subjected during normal storage. This temperature might accidentally be reached during summer months in the trunk of a car or in an un-insulated attic storage area.

Many types of proteinaceous materials which comprise water-soluble or dispersible protein are suitable for use in this invention. By water-soluble or dispersable protein is meant a proteinaceous material capable of forming a thermally reversible sol-gel system with water or mixed solvents in which water is usually (but not necessarily) present in major amount. Generally speaking, such a water soluble protein material is one which has numerous free-amino groups and acid-amide groups. Suitable water soluble or dispersible protein materials are fish glue, fish gelatin, partially hydrolyzed fish protein from fish skins, fish connective tissue, partially hydrolyzed vegetable protein such as that found in or isolated from the seeds of legumes, i.e. soybean protein; egg albumen, soluble blood albumen, and the like. By partial hydrolysis is meant chemical, thermal, or enzymatic degradation of protein normally not water soluble or dispersible but rendered so by the hydrolytic step. Various combinations of hide glue and bone glue of different gel strengths as determined by the Bloom Gelometer may be used. The preferred materials are fish glue, fish gelatin, animal hide glue, animal bone glue, and animal gelatin. These are all readily available standard articles of commerce which are water dispersible or water soluble at their respective iso-electric points.

It is desirable that the pH of the manufactured salmon egg bait as used be within the pH range of natural salmon eggs, i.e. pH 5.5 to pH 6.5. This is desirable to make the manufactured salmon egg less distinguishable from the natural salmon egg by the game fish. Also the storage stability of the manufactured salmon egg is better at an acid pH than an alkaline pH. At strong acid pHs of approximately pH 0 to pH 3 the taste of the manufactured egg approaches the tartness of the free acid while at strong alkaline pHs of approximately pH 10 to pH 14 the taste of the egg is bitter.

An important feature of the invention is the ability to use a protein material such as animal glue, and fish glue, which in itself is not a food on which trout in salmon-spawning streams are accustomed to feed, and to include with it in the mixture used for the original baitsphere formation, a portion of otherwise unusable salmon egg material such as fish egg skeins, broken fish eggs, small fish eggs, sera, etc., which are most conveniently added in a fine ground state. The water soluble portions such as fish egg interiors from broken fish eggs, the sera, etc., of course, do not require grinding or other processing to render them compatible with the animal glue solution. In the preferred embodiment of this invention, these natural fish egg protein pieces are embedded in a matrix of animal glue or fish glue in the gel spheres and when used as bait provide the same attractant odor and taste to the game fish as the whole natural salmon or other fish egg. Thus a new source of bait material is opened up for exploitation in addition to providing a use for otherwise discarded cannery waste. Other fish waste such as eggs from such species as cod, halibut, sturgeon, or the like which are much too small to be used individually by themselves as bait may be included in a water soluble protein matrix and thereby confer on the manufactured bait any natural attraction which they may have toward trout, which enhances the bait possibility. In addition, any fish by-product materials such as fish meal, herring meal, fresh ground scrap fish, etc. may be included in the animal glue or similar matrix and utilized to enhance the attractiveness of the manufactured bait to trout and other game fish.

After the gelationous material formed from the protein material described above has been formed into the substantially spherical shapes and cooled, the surface is treated with a tanning agent to render the exterior of the spherical particle non-soluble in water and to form a skin-like surface of treated proteinaceous material. Suitable tanning agents include mono-aliphatic aldehydes such as: formaldehyde and its homologues, acetaldehyde, propionaldehyde or the like, and; aliphatic di-aldehydes such as glyoxal and its homologues.

While a satisfactory bait may be manufactured from a water soluble protein, water, and a tanning agent; it is frequently desirable to include a plasticizing agent which will maintain the bait in a uniform degree of pliability or softness. Suitable plasticizing agents having utility in developing and maintaining a soft gel consistency below the sol-gel transition temperature of the protein composition include humectants such as the glycols. Ethylene glycol, propylene glycol, 1,2 butylene glycol and the like, as well as mixtures thereof are typical examples of humectant glycols useful in this invention. These and other humectant glycols exhibit varying abilities to act as bridge solvents for the fish oil, such as salmon egg oil, herring oil, and the like, used to give characteristic attractant odors to the manufactured salmon egg. A particularly good family of humectants are the polymers of ethylene oxide such as di-ethylene glycol, tri-ethylene glycol, tetra-ethylene glycol, and higher polyethylene glycols having molecular weights up to approximately 4000. There seems to be no upper limit to the usable molecular weights of the polyethylene glycols when the separate viscosity contribution due to the higher molecular weight compounds is taken into account. If the ratio of the quantity of ingredients is kept constant, the viscosity of the resulting blend is a direct function of the molecular weight of the polyethylene glycol in the blend. Therefore the upper limit of the molecular weight of any polyethylene glycol is determined by the upper limit of the viscosity of the protein-water-polyethylene glycol blend used. Since these blends are usually pumped during bait source deposition this upper molecular weight limit is governed by whatever viscosity of the mix is conveniently pumpable. Another class of useful humectant compounds are the water miscible polymers of propylene oxide such as di-propylene glycol, tri-propylene glycol, and the like.

Yet another class of useful plasticizer are the reaction products of an alkylene oxide such as ethylene or propylene oxide with a non-similar alkylene oxide, glycol, or aliphatic compound containing two or more free and reactive hydroxyl groups. Such compounds are of a wide variety and are widely used as the polyol element in polyester, epoxy, and polyurethane resins. Typical examples are the block polymers of ethylene oxide, propylene oxide, and butylene oxide; hydroxyethyl glucose, hydroxyethyl sucrose, hydroxyethyl derivatives of a sugar or similar hydroxyl-containing products obtained from starch or cellulose. Various mixtures of the monomeric and polymeric glycols and other humectants may be utilized in this invention to tailor the precise mix viscosity desired while obtaining the proper pliability or softness of the finished product. In general a suitable plasticizing glycol is one which is miscible with the water present in the egg-forming composition at room temperature and does not form a separate liquid phase under the conditions of use. The matter of choice of humectant is largely a matter of economics since a relatively large number of humectants have been used with animal and fish glues.

In the following examples animal glue is the water-dispersible protein used throughout since it is readily available in well recognized commercial grades of definite gel strength.

EXAMPLE I

One modification of the manufacturing process whereby fish bait is prepared is as follows: A colloidal solution was made of 300 grams of hide glue having a gel strength of 495 grams (Bloom Gelometer), 700 grams water, and 300 grams of tri-ethylene glycol by gently heating the mixture over a water bath to a temperature of 180°F. and holding the mixture at this temperature. The solution was stirred gently to avoid foaming until homogenous. This glue solution was then pumped through a small copper tube in discrete slugs of volume approximately 0.17 ml. per stroke of a metering pump operating at 60 strokes per minute. The storage reservoir for the glue, the pump and the copper tubing were externally heated by means of electric tape heaters maintained thermostatically at the temperature of approximately 180°F. The copper tubing was arranged to have sufficient length and turns for proper flexing to enable the tubing to move in a circular path with the exhaust end of the tubing just above the surface of a cold oil bath. The copper tubing was supported by being attached to a horizontal circular disc which in turn was supported by a free rotating support mounted perpendicularly to the plane of the disc and extending downwardly toward the oil bath surface. The tubing support was mounted a short distance out from the center of the disc and described a circle somewhat smaller than the circumference of the oil tank. The disc was mounted so that its plane was horizontal on a vertical axis above the center of the cold oil bath which enabled the disc to rotate in the horizontal plane, the rotation being around the vertical axis. The disc was rotated in an incremental fashion by a ratchet and pawl apparatus of 30 stops disposed equally around the circumference of the disc. Enough braking action was obtained from a small brake acting between the plywood disc and its vertical shaft so that while the disc advances 1/30 of its circumference with each stroke of the pawl, the disc came to a full stop and remained stopped until the metering pump caused one slug of approximately 0.17 ml. of glue mixture to squirt or drop from the outlet of the copper tubing. The metering pump and the rack and pinion were operated from the same power source coupled through the same spaced reducer. It is convenient that the glue mixture be pumped in discrete and constant volumes to insure a constant diameter of the artificial salmon egg product. It is absolutely essential that the exhaust end of the copper tubing be stationary with regard to the surface of the cold oil bath at the time the hot glue mixture is pumped and dropped onto the surface of the cold and motionless oil bath in order to make spheres. If there is any differential motion between the exhaust end of the copper tubing and the surface of the cold oil bath, the pumped discharge will be spread out on the surface of the cold oil to some extent and multiple small particles or irregular particles result rather than a single sphere. The pump discharge must be accomplished with the discharge point at rest with respect to the cold oil surface into which the discharge is made in order to make spheres. The pumping action and the advancing action of the disc were substantially out of phase as well as being intermittent. The ratchet and pawl device which translated a sliding back and forth linear motion into an intermittent rotary motion was equipped with a clutch to enable the operator to quickly and accurately adjust the relative position of the rack and pinion to the stroke of the pump so that the deposition of the glue mix was made in the "at rest" position of the disc. The glue mix was allowed to drop in free fall through about 2 inches of air before hitting the surface of the cold oil. Once the droplet of glue mix was below the surface of the cold oil, the surface tension of the glue droplet caused it to assume a spherical shape. The oil was maintained at approximately 24°F. by external refrigeration, the cooling being transmitted through the walls of the tank holding the oil. The oil, which was a refined petroleum product known as White Oil number 15 (obtained from Standard Oil Company of California) had a viscosity of 350 S.S.U. at 100°F. and was refined to be acceptable as an addition to edible foods according to U.S.F.D.A. Standards. The time of fall through the 60 inches of cold oil for a sphere of volume 0.17 ml. was about 2 minutes. The specific gravity of the glue mix was about 1.10 at 70°F. and the specific gravity of the White Oil number 15 was 0.869 at 77°F. The glue mix was liquid at a temperature of 180° F. as it dropped through the air and hit the cold oil. As the sphere sank heat was abstracted from it and the glue mixture gelled progressively from the surface to the interior as soon as the temperature fell below the sol-gel transition temperature for the mix. The cold solid spheres were caught at the bottom of the cold oil tank in a wire basket. The basket was made of wire mesh and was equipped with a handle which folded down out of the way of any descending glue spheres. A thin flexible wire was attached to the handle to allow the basket to be lifted out at the conclusion of a deposition run. The tank holding the cold oil was a steel drum having a refrigerant coil wrapped around the exterior of the tank in heat exchange relationship to remove heat from the oil and maintain the oil at the desired temperature of approximately 24°F.

After all of the glue mix had been pumped into spheres in the cold oil and the spheres solidified and settled into the basket at the bottom of the tank, the basket was raised and allowed to drain until the bulk of the occluded White Oil drained back into the tank.

The cold, solid spheres of glue mix were water soluble at this stage of the processing. Spheres dropped into a beaker of 140°F. water, for example, softened, lost their shape, and in about 10 minutes of stirring were dispersed. Similarly, spheres in 70°F. water for 24 hours dispersed to give a thin colloidal glue solution.

The water soluble gelled spheres of glue mix were then washed with an aqueous detergent solution having a temperature low enough to prevent any appreciable solubilizing of the glue mix gel. This was accomplished by moving the wire basket containing the cold glue mix spheres up and down in a vessel containing a washing solution made from 55°F. tap water and detergent until the oil film was substantially washed off. Usually this takes about three minutes. After the washing step, the basket of cold glue spheres is removed from the detergent-oil solution, allowed to drain, and then rinsed twice with cold 55°F. water to further remove any occluded oil film. It is not essential that the oil film be completely removed only that if any film does remain, it should not interfere with the subsequent tanning step. After the oil removal washing and rinsing steps, the spheres of glue mix minus their oil films were immersed in a tanning solution to tan or harden the surface of the spheres (or eggs) of glue gel and develop a skin. The tanning solution consisted of 500 ml. of Tech. 37% formaldehyde solution diluted with 9500 ml. of cool (55°F.) tap water. The eggs in their wire basket were dipped into the dilute formaldehyde solution (2.01% formaldehyde by weight) and mildly agitated to insure complete contact between the eggs and the tanning solution. The total contact time was 5 minutes. After the tanning treatment the eggs were immediately removed and washed under a mild spray of cool tap water (55°F.) to remove any formaldehyde solution. Washing with the spray was continued for several minutes until the odor of formaldehyde appeared substantially gone. The eggs at this stage were slightly rubbery to hard and one half of the batch was packed in 2 oz. glass jars for use as fish bait. The remaining one half of the batch was stored in a clean covered container at room temperature (70° F.) for 24 hours and then dyed in a combination swelling and dyeing operation. A solution of 2 grams of the orange-red dye known as Acid Orange in 5000 ml. of water (70°F.) was made up and the one half batch of tanned eggs was immersed in it. After about 20 minutes the eggs were judged sufficiently dyed and the dyed eggs were removed from the dye solution, rinsed and immersed in tap water at 70°F. After soaking 24 hours at 70°F. the dyed eggs had swollen so that the average egg volume was 0.26 ml. for a 53% increase in volume. These eggs were tested and found to withstand the insertion of a No. 8 fishhook without splitting and to hang well on the hook during casting. Comparative testing at a commercial trout rearing farm showed that the trout fed equally on the product bait and commercially available preserved natural salmon eggs of the same size and color. The product egg has been found to be fully equivalent to the natural salmon egg as a bait for trout. These orange-red dyed product eggs were hermetically sealed in glass jars holding 2 oz. of eggs and ⅛ oz. of herring oil and were remarkably like the natural product dye a similar shade. The product eggs were resistant to melting or fusing together when indurated at 145°F. in an oven for 2 hours. No dispersion of the eggs was observed after immersing the eggs in 200°F. water for 5 minutes. The presence of the skin layer which differs from the interior of the egg in physical property is shown by taking an egg after the formaldehyde tanning treatment and immersing in water and allowing to swell. When the egg was split open there was a distinct line of different refractive index, showing how far the formaldehyde had penetrated. By gently abrading the egg it was possible to separate the tanned skin from the gelatinous interior. The product egg has thus been demonstrated to have a skin similar to the preserved natural salmon egg, in addition to a similar shape, consistency, and odor. The skin when punctured by the fish hook allows some of the protein material from the interior to leach into the fishing stream or lake where it can act as an attractant for fish. The protein material in the interior may be untanned or only slightly tanned compared to the skin and is thus much more soluble by comparison to the exterior.

EXAMPLE II

A colloidal solution was made of 300 grams of hide glue (Bloom Gelometer) gel strength 218 grams, 600 grams of water, 300 grams of tripropyleneglycol, 5 grams of titanium dioxide pigment and 0.05 grams of Acid Orange dye by heating the mixture gently on a water bath to a temperature of 180°F. and holding at this temperature while gently stirring until homogeneous. Spherical egg-shaped solid gel masses having a toughened skin tanned by formaldehyde immersion were made according to the deposition process and tanning treatment outlined in Example I. These eggs were between 7 and 8 mm. in diameter and had a pale pink color similar to processed natural salmon eggs. They were elastic, hung well on a No. 8 fishhook, and withstood casting. One half of this batch was dyed in a dye solution consisting of 5 grams Brilliant Sulfo-Flavine FFA Dye and 0.1 gram Acid Orange Dye dissolved in 5000 ml. of 65°F. water by immersing for 20 minutes. After the dyeing treatment the eggs were swollen in tap water at 65°F. for 24 hours. These eggs were 9 mm. in diameter and were quite similar in shape, color and texture to the "Cheese" processed natural salmon egg of commerce. The eggs were then dipped into a thin viscosity White Oil containing artificial cheese flavor, drained and hermetically sealed in 2 oz. glass jars. These eggs in the glass jar withstood testing in an oven at 145°F. for 6 hours without loss of shape or fusing and when cooled to room temperature retained their original texture. When tested at a trout farm they were found to attract fish equally well to processed natural salmon eggs of similar size, color and odor. These eggs were found to be resistant to decomposition by naturally occuring molds and bacteria and did not require the separate addition of a bactericide. It is thought that this anti-fungal and anti-bacterial activity is due to the formaldehyde reaction product with the protein in the skin of the egg acting together with the tri-propylene-glycol.

EXAMPLE III

In order to show the effect of the concentration of formaldehyde in the development of egg skin and its effect on subsequent swelling of the egg, a batch of eggs was processed through the chilling step and the oil film removal washing step as described above in Examples I and II, from a mixture of 300 grams animal glue (gel strength 192 grams), 600 grams water and 300 grams triethylene glycol. Separate batches of these untanned eggs were then treated by immersing for 5 minutes in 2.01, 8.16, and 14.10% by weight of formaldehyde in water at 55°F. The eggs after tanning were rinsed free of the tanning solution, drained, and allowed to stand in a closed container for 2 hours before immersing in tap water at 70°F. for swelling and in boiling water. At the end of 100 minutes and 180 minutes immersion in the swelling water, the average egg volume was determined by taking 10 individual eggs, drying the occluded surface moisture off quickly with a paper towel and measuring the increase in volume when immersed in 5 ml. of water in a 10 ml. graduate. The increase divided by 10 is the average egg volume.

TABLE I

| Concentration of HCHO | Average egg volume before swelling | 70°F water 100 min. average egg volume | 70°F water 180 min. average egg volume | 212°F water 10 min. average egg volume |
|---|---|---|---|---|
| 2.01% | 2.3 ml. | 3.7 ml. | 4.5 ml. | not tried |
| 8.16% | 2.4 ml. | 3.4 ml. | 4.2 ml. | not tried |
| 14.10% | 2.2 ml. | 3.4 ml. | 3.9 ml. | 3.8 ml. |

These data show that the higher concentration of the formaldehyde in the tanning bath the less is the rate of swelling and the smaller is the finally attained average egg volume. Furthermore, with eggs tanned with 14.10% formaldehyde, swelling may be accomplished within approximately 10 minutes in boiling water comparable to swelling for 3 hours in water at 70°F. It is preferable to carry out the swelling at lower temperatures than boiling since more leeway is permitted in the timing of the operation to produce the desired swelling. The higher the temperature, the more rapid is the swelling and as a consequence less control is possible on a large commercial scale. In these water swelling experiments a product having a maximum ratio of 1.95 of swollen volume to original volume was obtained.

EXAMPLE IV

In order to show the effect of concentration of formaldehyde on the ability of the egg to withstand storage at elevated temperature (145° F.), a batch of eggs was prepared similar to Example III except for the tanning treatment, and then these eggs were treated with various concentrations of formaldehyde (HCHO) solution as follows for five minutes at 55° F.: 0.403, 0.806, 1.209, 1,612, 2.015 and 2.418% formaldehyde by weight in water, drained, washed free of formaldehyde solution using 55° F. tap water, drained, stored in a closed container for 24 hours at 65° F. and then tested in sealed 2 oz. glass jars held in an oven at 140° F.

A similar series was run substituting hexamethylenetetramine (HMTA) for the formaldehyde (HCHO), the HMTA at concentrations of 3.82 and 32% by weight in $H_2O$. The 3.82% HMTA solution corresponds to 2.015% HCHO by weight. A similar series was run substituting various inorganic tanning solutions for the HCHO as follows: 10% aluminum formo-acetate (AlFA) by weight in $H_2O$; 10% aluminum acetate, $Al(C_2H_3O_2)_3$, (AlAC) in water; 10% aluminum potassium sulfate, $Al_2(SO_4)_3.K_2SO_4.24H_2O$ (potash alum) in water; 10% aluminum sodium sulfate, $Al_2(SO_4)_3.Na_2SO_4.24H_2O$, (SAS) in water; 10% aluminum sulfate, $Al_2(SO_4)_3$, (alum). A similar series of tests was run using various combinations of HCHO and alum at various treatment durations. The artificial salmon eggs thus treated were subjected to storage at 145°F. for 6 hours to determine the relative stability of the product treated with the various tanning agents. The results are presented in Table II.

TABLE II

| Tanning agent % by weight in aqueous solution | Treatment time- minutes | Observations after storage at 145° F. for 6 hours |
|---|---|---|
| 0.403% HCHO | 5 | melted |
| 0.806% HCHO | 5 | Did not melt but deformed slightly |
| 1.209% HCHO | 5 | Did not melt but deformed slightly |
| 1.612% HCHO | 5 | Did not melt but deformed slightly |
| 2.015% HCHO | 5 | retained shape |
| 2.418% HCHO | 5 | retained shape |
| 3.82% HMTA | 5 | melted |
| 32% HMTA | 5 | melted |
| 10% AlFA | 20 | melted |
| 10% AlAC | 20 | retained shape |
| 10% Potash Alum | 20 | melted |
| 10% SAS | 20 | melted |
| 10% alum | 20 | melted |
| 4.04% HCHO 10% alum | 5 | retained shape |
| 4.04% HCHO 10% alum | 20 | retained shape |
| 2.02% HCHO 10% alum | 5 | retained shape |
| 2.02% HCHO 10% alum | 20 | retained shape |
| 2.02% HCHO 1% alum | 5 | retained shape |
| 2.02% HCHO 1% alum | 20 | retained shape |
| 0.404% HCHO 1% alum | 5 | stuck to jar but did not melt |
| 0.404% HCHO | 20 | retained shape |

These data show the superior property of formaldehyde (HCHO) over Hexamethylenetetramine (HMTA) and alum type tanning agents in developing resistance to melting at 140° F. The hexamethylenetetramine tanned samples (5 minutes at 55° F.) melted when exposed to sunlight in a window where the maximum temperature measured in the jar was 102° F. A combination of 0.40% formaldehyde and 1.0% aluminum sulfate is effective when used for a 5 minute treatment at 55° F.

The effect of the tanning treatment with aldehyde or alum solution is to form skin around the glue mix. This skin consists of a water insoluble gel in which the protein chains are crosslinked with aldehyde, alum or other tanning agent. A semi-permeable membrane results through which water can pass. When the tanned egg is immersed in water, the water moves through this semipermeable membrane developing osmotic pressure, resulting in an enlarged egg. The swelling rate is enhanced if a water soluble material such as sodium chloride or glucose is a part of the mix and hence a part of those solubles on the inside of the semi-permeable membrane skin affecting the osmotic pressure when the egg is immersed in water.

EXAMPLE V

In order to show the effect of sodium chloride and glucose on the swelling rate of the tanned egg, a batch (A) of eggs was prepared as outlined in Examples I and II from a mix consisting of 300 grams of hide glue (gel strength 495 grams), 30 grams of sodium chloride, 650 grams of water, and 300 grams of triethyleneglycol. Another batch (B) of eggs were prepared from a mix consisting of 300 grams of hide glue, 650 grams of water, 300 grams triethylene glycol, and 30 grams glucose. These were compared with a standard batch of eggs prepared from a mix consisting of 300 grams of hide glue, 650 grams water, and 300 grams triethylene glycol. These three batches of eggs were processed and tanned in identical fashion with Example I, and were washed after tanning but with no dyeing. These eggs were then measured for average egg volume and then immersed in water at 65° F. for swelling tests. The initial or starting volume was taken as 1, and the ratios of the swollen volumes to the original was recorded. The rates of swelling were as follows:

TABLE III

| Swelling time (minutes) | Ratio of volume of swollen egg to original egg volume | | |
|---|---|---|---|
| | Standard | NaCl A | Sucrose B |
| 0 | 1.00 | 1.00 | 1.00 |
| 85 | 1.29 | 1.40 | 1.50 |
| 145 | 1.46 | 1.60 | 1.71 |

All of these eggs held well on a fish hook and made a very satisfactory bait. The swollen (145 min.) eggs were removed from the solution, drained, and packed in 2 oz. glass jars. These exhibited good storage life.

EXAMPLE VI

A salmon cannery waste consisting of crushed Chum salmon (*Onchorynchus keta*) eggs having an effective solid content of 45% was suspended in an equal weight of water and ground in a Waring blender until substantially all passed through a 325 mesh screen (2% retained). Fifty grams of this fine ground salmon egg residue suspension (solids content 22.5 grams) was blended with 300 grams animal glue (192 grams gel strength, Bloom Gelometer), 600 grams of water, 300 grams of tri-ethylene glycol and heated to 180° F. until the animal glue was in solution and the mixture homogeneous. This liquid mixture containing some Chum salmon egg particles in suspension was used to make eggs as in Example I dyed by immersion for 5 minutes (28) in a dye bath containing 0.08% fast red ALS dye and 0.24 acid orange dye. The product had an odor identical with normal process whole Chum salmon egg bait, and with the exception of the missing oil sac was virtually indistinguishable from commercial process salmon eggs in shape, color, texture, acidity (pH of 5.5) and ability to attract trout. This demonstrates the effectiveness of a mixture of protein material containing as little as 3.9% salmon egg solids residue based on the total protein solids present or 0.91% salmon egg solids residue of the finished egg. A portion of these eggs, each having a volume of 0.31 ml., was soaked in tap water at 65° F. After 95 minutes the average egg volume was 0.41 ml. and it hung well on a fish hook. After 240 minutes soak the average egg volume was 0.45 ml. and hung well on a fish hook. A portion of these having an average egg volume of 0.41 ml. was dyed and packed in a 5% solution of tri-ethylene glycol in water. This gave a satisfactory fish bait.

EXAMPLE VII

A mixture was made of 300 grams of animal glue (192 gram gel strength Bloom Gelometer), 1524 grams of the fine ground Chum salmon egg and egg skein residue prepared as in Example VI (having a solids content of 762 grams), 300 grams tri-ethylene glycol and 0.25 grams acid orange dye, was heated on a water bath to 180° F. until the animal glue was completely dispersed, and the mixture was homogeneous. This mixture was formed into eggs and tanned in the same manner as Example I. The product spheres were an opaque orange red color and had an odor indistinguishable from the natural Chum salmon egg bait. The interiors were elastic and had a pH between 5.5 and 6.0. The eggs hung well on a fish hook and were attractive to trout in practical test at a trout hatchery. This demonstrates the use of cannery residue in an amount equal to 35.8% by weight of the total egg. A portion of these eggs were immersed in a solution of acid orange dye, 0.5 grams in 100 grams water for about 3 minutes at 100° F. until they attained a suitable orange-red color. These were then drained to substantial dryness and packed in mineral oil in hermetically sealed glass jars. The salmon odor acquired from the fish waste added to the attractiveness of the bait.

EXAMPLE VIII

To demonstrate the ineffectiveness of hexamethylene tetramine as a tanning agent and to show that it is not equivalent to the aldehyde tanning agents, a series of untanned gelled egg spheres were produced as in Examples I and II but without the tanning step. These spheres were then exposed to hexamethylene tetramine for various periods of time. None of the eggs so treated developed the exterior skin characteristic of the eggs treated with lower aldehydes and all melted when exposed to 140° F. atmosphere. The results are presented below:

TABLE IV

Treatment of untanned gelled spheres with HMTA

| Time of exposure to HMTA(32% by weight) | Skin formed | Results on exposure to 140° F. for 10 minutes |
|---|---|---|
| 3 minutes | no | melts |
| 10 minutes | no | melts |
| 60 minutes | no | melts |
| 20 hours | no | melts |

EXAMPLE IX

A fish waste consisting of 330 grams of cod eggs (the individual eggs were approximately 1 mm. in diameter as received) in the natural skeins, and having a solids content of approximately 35% by weight as determined by drying for 24 hours at 212° F., was suspended in 330 grams of water and wet ground in a Waring Blendor until it substantially passed through a 325 mesh screen (with approximately 3% retention). This fine ground cod egg residue was mixed with 300 grams of hide glue of 192 grams gel strength, 300 grams tri-ethylene glycol and 90 grams water and heated to 180° F. until the animal glue was dispersed and the solution was homogeneous. The mixture was used to prepare and tan eggs as in Example I. The product eggs were 10 mm. in diameter, opaque, had the characteristic odor of natural cod eggs, and made an attractive fish bait. This demonstrates the effectiveness of the process enabling the use of fish eggs too small to be used by themselves in a single egg fish bait. A portion of these eggs were packed in a 10% solution of tri-ethylene glycol in water and they retained their shape well on storage. The fish egg odor being acquired by the tri-ethylene glycol water solution thus providing a means for disseminating the game-fish attracting odor in the fishing stream. The glycol-water solution attached to the bait as it is strung on the fishhook disperses in the lake or stream and acts as an additional attractant.

The milt obtained from the male salmon at a fish hatchery during spawning season may be incorporated with any of the protein mixes prior to the egg formation process or combined with the packing fluid, thus conveying to the artificial egg the odor and taste of the salmon milt. This has particular benefit as an attractant for trout in fishing streams known to have native salmon runs since the salmon eggs naturally available to the trout for food are fertilized salmon eggs.

The effect of temperature during the tanning step is critical. If the cold temperature gelled spheres, which are water dispersible prior to tanning, are subjected to temperatures in air or when immersed in water or tanning solutions above about 70° F. the individual eggs tend to lose their spherical shape and blocking or surface fusion of the eggs occurs. It is desirable to carry out the washing step at temperatures below that temperature at which the eggs are distorted by their own weight in the mass. This temperature varies with the chemical composition and in general, the lower the percentage of animal glue or other water soluble protein, or the lower the Bloom Gelometer gel strength of the protein mix in the egg forming composition, the lower must be the washing temperature. The same is true of the tanning temperature. Tanning can take place satisfactorily from approximately 32° F. on up to room temperature, approximately 70° F. The preferred operating temperature being about 55° F. Above approximately 70° F. there is an area of temperature of limited usefulness since in order to be successful the tanning action has to be faster than the melting or blocking of the egg-forming-composition under such condition. For example, cold temperature gelled spheres from a composition of 100 grams of hide glue (gel strength 192 grams), 100 grams of tri-ethylene glycol, and 200 grams water, are distorted in shape before satisfactory tanning occurs when immersed in 10% aluminum sulfate aqueous solution at 110° F. or in commercial formalin (i.e. 37% formaldehyde in water by weight) at 140° F. It is the blocking temperature of the untanned egg-forming composition which is important and in formulating a new egg-forming composition it is imperative that the blocking temperature in the presence of solvent and water of the composition be determined and the processing be accomplished at operating temperatures below this critical blocking temperature in the solutions involved. There is an upper temperature which is dependent to some extent on the kind and concentration of the tanning agent, the protein gel strength, and the concentration of the protein in the egg-forming composition, the temperature of the entering cold temperature gelled spheres, and the time of immersion beyond which only a distorted egg results. This is best determined experimentally for each new chemical combination and if distortion of the tanned product egg is apparent then the operating temperature should be lowered until no distortion results. The steps of oil-removal and tanning may be conveniently accomplished simultaneously by washing the cold temperature formed spheres in an aqueous solution containing both detergent or oil-dispersing surfactant and a tanning agent. A suitable detergent is a blockpolymer, a polyoxyethylene-polyoxypropylene-glycol having a molecular weight of about 1750 on the polyoxypropylene portion of the molecule and having 40% polyoxyethylene in the molecule such as the commercial product made by Wyandotte Chemical Corporation known as Pluronic RL64, or a polyoxyethylene-polyoxypropylene-glycol in which the molecular weight of the polyoxypropylene-moiety is 3250 and there is 30% polyethylene in the molecule such as Wyandotte Chemical Corporation, Pluronic RL103, or any commercial detergent suitable for clothes washing such as "Tide", a product of Proctor and Gamble. Various combinations of detergent or surfactant and tanning agent may be used. An aqueous solution containing 0.125% by weight of detergent ("Tide") and 2.01% formaldehyde by weight gives a satisfactory combination wash and tanning at 70° F. and up to 30 minutes or so of combination wash and tanning at 55° F.

While we prefer to remove the cold oil from the spheres by washing in cold water containing a detergent, an alternative procedure is to remove the oil by extracting with an organic solvent such as carbon tetrachloride, trichloroethylene, benzene, methyl alcohol, or the like. Care must be taken to air dry the washed product after such solvent treatment in order to remove the odor of such solvents. The flammability of such solvents must be taken into account in such processing and the safety of such procedure established before use. An alternative processing step for the aqueous tanning is to use an aldehyde dissolved in a suitable organic solvent, formaldehyde or acetaldehyde dissolved in methyl alcohol for example. Gaseous treatment of the gel spheres with low molecular weight tanning agents could be undertaken to tan the spheres, for example in a fixed or fluidized bed process.

Hide glue and bone glue (denoting origin) are available commercially in grades varying from about 85 grams to about 512 grams gel strength as measured by the Bloom Gelometer. Satisfactory imitation salmon egg bait has been made from the entire range of gel strengths, i.e. from 85 grams to 512 grams. We prefer to use a hide glue with a gel strength of 192 grams. The maximum amount of a particular humectant glycol which can be used with hide glue of gel strength 192 grams varies with the type of glycol. With ethylene glycol, 600 grams of ethylene glycol (66% by weight of the mix) can be combined with 100 grams of hide glue dispersed in 200 grams of water. The glue and water are melted up together first and then the glycol is added carefully. With the tri-ethylene glycol, 410 grams of tri-ethylene glycol (58.5% by weight of the mix) can be added to a solution of 100 grams hide glue in 200 grams of water previously melted together. With tri-propylene glycol, 130 grams of tri-propylene glycol (30% by weight in the mix) can be added to a solution of 100 grams of hide glue in 200 grams of water previously melted together. When only hide glue of 192 grams gel strength and water are used, the upper limit is about 285 grams of water to 100 grams of the glue.

A suitable method for achieving an odor in the imitation salmon egg which is very close to the characteristic fishy odor of the natural salmon egg is to include in the egg-forming composition a portion of the odoriferous sodium chloride brine in which natural salmon eggs have been processed to make red caviar or in which natural salmon eggs have been packed, stored, or processed in the commercial salmon egg bait industry. In the processing of natural salmon eggs for bait, the eggs are usually singled out at the cannery and these eggs are immersed in a sodium chloride brine and stored under refrigeration at approximately 45° F. prior to processing into bait. The sodium chloride brine usually is between a 50% and a 100% brine. During the processing of natural salmon eggs into bait, the eggs are cooked in the brine. After the cooking step the eggs are drained from the brine and the brine discarded. This brine contains dissolved and suspended quantities of salmon egg oil and other salmon egg constituents such as protein in addition to portions of sera and skeins in which the eggs were surrounded while in the female salmon. The sodium chloride has a peptizing action on much of the salmon protein material. The bait and caviar industry waste brine is ideal for inclusion in our imitation bait not only for the salt which has an advantageous osmotic pressure effect, but primarily for the distinctive odor and taste which makes the bait attractive to game fish and which odor is peculiar to the salmon egg oil, the salmon egg and sera protein materials.

The ability of our proteinaceous spheres having a tanned skin to swell when subjected to water or certain aqueous solutions is an important part of our invention, since it is relatively easier to produce uniform undistorted small spheres in the chilling step and then enlarge them by subsequent swelling with water or other swelling-active aqueous solutions. Tanned spheres of 2.3 ml. average egg volume and made from egg-forming mix consisting of 300 grams of hide glue (192 grams gel strength), 650 grams of water, and 300 grams of tri-ethylene glycol and tanned for 5 minutes in 2.01% formaldehyde solution were immersed for 24 hours in water and in various concentrations of tri-ethylene glycol in water. The following table shows the average egg volume attained in the 24 hour soaking period in the various solutions having various amounts of tri-ethylene glycol.

Swelling only occurred in solutions between 0–30% tri-ethylene glycol. This shows that swelling to an average egg volume 2.83 times the initial egg volume at the beginning of the swelling can be accomplished within 24 hours at 65° F. and give a useful bait.

TABLE V

| Swelling solution, concentration of tri-ethylene glycol | Average egg volume after 24 hours, 65° F. | Condition |
| --- | --- | --- |
| 0% | 6.5 ml. | Elastic, hung on hook |
| 10% | 4.8 ml. | Elastic, hung on hook |
| 20% | 3.5 ml. | Elastic, hung on hook |
| 30% | 2.3 ml. | No change |
| 40% | 1.7 ml. | Less elastic |
| 60% | 1.2 ml. | Less elastic |
| 80% | 1.05 ml. | Less elastic; harder |
| 100% | 0.99 ml. | Inelastic and hard |

It is desirable to pack imitation salmon eggs in an iso-tonic solution in which no further swelling will take place. To do this a 24 hour swelling series should be run using the product eggs to be packed and using the water and varying amounts of the glycol of the egg-forming composition under consideration. By making a graph of the average egg volume versus the concentration of glycol in the swelling solution, a smooth curve results from which the proper iso-tonic concentration can be determined for any given average egg volume desired.

It is important in forming spheres from the egg-forming mix that the molten mix be pumped in discrete and exact volumes corresponding to the egg size desired. This is conveniently done by using a metering pump such as a diaphragm type pump which is adjustable while pumping. It is desirable to have a sufficient interval between the discrete volumes of molten mix so that successive eggs do not pile up on one another as they descend through the cold oil bath. If contact between two forming eggs occurs, one invariably wraps around the other to give a toroidal shaped product. While toroidal shapes are still usable as bait, they are not acceptable as the spheres of imitation salmon eggs. This piling up action may be avoided by spacing the pumping strokes so that contact between descending eggs is completely avoided while they are substantially molten and deformable. Once the eggs are chilled enough to gel, the eggs may contact one another without harm as indeed does happen when they are caught in the basket at the bottom of the cold tank. The rate at which spherical eggs descend through White Oil No. 15 (viscosity 350 SSU at 100° F., specific gravity 0.869 at 77° F.) is a function of the diameter of the egg and the viscosity of the cold oil, which in turn is mainly a function of the temperature. Typical approximate values for White Oil No. 15 for various egg diameters and oil temperatures, where the length of fall was 12.625 inches are as follows:

TABLE VI

| Diameter of egg | 30° F. | 40° F. | 50° F. | 60° F. | 70° F. |
| --- | --- | --- | --- | --- | --- |
| 10 mm. | 7 sec. | 5 sec. | 3.5 sec. | 3 sec. | 2.9 sec. |
| 8 mm. | 9 | 6 | 5.5 | 4 | 3.5 |
| 5 mm. | 16 | 13 | 9 | 7 | 5 |

Operating at these temperatures the time of separation of succeeding pump strokes should be at least the values shown where there is a chance that successive eggs could pile up in the descent and the egg-forming mix is pumped into the cold bath from a stationary efflux tube. It is not essential that the molten-egg-forming mix fall any distance through air before entering the oil bath. It is desirable to avoid excessive height of drop which may, with some egg-forming mixes, give rise to spattering of the mix and resultant small droplets. The egg-forming mix may be introduced beneath the surface of the oil bath, if desired, care being taken to maintain the entering tip of the efflux tube at a temperature above the solidification temperature of the egg-forming mix so that it is pumpable and does not solidify or gel on the tube tip. Temperature control on the tip is easily accomplished by having a graded temperature zone in the cold oil bath such that the upper and warmer layer is at such a temperature that at no time during the intermittent contact of the tip with the oil in the pumping cycle does sufficient cooling take place to lower the temperature of the egg-forming mix below its solidification temperature. The thermostatic control of the temperature of the tip may be accomplished using electric heaters.

While we prefer to use a viscous refined petroleum product known as White Oils, other materials and blends are equally suitable, the main criterion being that the viscosity of any other of the substitute cooling baths be comparable to the viscosity of the White Oils at the operating temperature (the viscosity of the White Oils measured at 100° F. is between about 85 SSU and 460 SSU) so that sufficient time for descent, i.e. at least 30 seconds for a droplet 8 mm. in diameter in order to effectively cool and gel the surface of the forming egg sufficiently to prevent distortion of the egg shape in further processing. This 30 seconds is for a bath having a temperature of 24° F. At other temperatures the allowable descent time will vary proportionately. Larger diameters require a proportionately longer minimum time of descent, other factors being constant than smaller diameter spheres. Where a longer time of descent is desired a proportionately taller oil bath is required.

Vegetable oils, fish oils, and blends with petroleum oils or other compatible materials having a specific gravity less than the specific gravity of the egg-forming mix are usable. An oil bath containing a portion of fish oil is particularly advantageous in that the odor of the fish oil is imparted to the product egg during the cooling-solidification step.

What is claimed is:

1. The process for preparing nonhomogeneous fish bait comprising:
    preparing an admixture consisting essentially of a gel-forming proteinaceous material and water at a temperature above the sol-gel transition temperatures thereof in the absence of a tanning agent to form a homogeneous liquid proteinaceous mass;
    dividing and shaping said liquid proteinaceous mass into individual shaped elements;
    cooling said individual shaped elements to a temperature below the sol-gel transition temperature to form gelled shaped elements; and
    forming a cross-linked exterior surface on said gelled shaped elements by exposing the exterior of said gelled shaped elements to a tanning agent chosen from the group consisting of formaldehyde, aluminum acetate, and mixtures of formaldehyde and aluminum sulfate at a temperature below the blocking temperature of said gelled shaped elements for a time sufficient to produce toughened proteinaceous fish bait wherein said cross-linked exterior surface is capable of withstanding exposure to a temperature of 140°F. for 2 hours without blocking, said toughened proteinaceous fish bait having a relatively water insoluble exterior surface surrounding a relatively noncross-linked gelatinous body having a substantially higher solubility in water than said exterior surface.

2. The process of claim 1 wherein said proteinaceous material is chosen from the group consisting of animal glue, fish glue, fish gelatin, partially hydrolyzed fish protein from fish skins, fish connective tissue, vegetable protein, egg albumin, soluble blood albumin, fish eggs, fish egg skeins and fish viscera.

3. The process for preparing nonhomogeneous fish bait comprising:
    preparing an admixture consisting essentially of a gel-forming proteinaceous material and water at a temperature above the sol-gel transition temperature thereof in the absence of a tanning agent to form a homogeneous liquid proteinaceous mass;
    dividing and shaping said liquid proteinaceous mass into individual shaped elements;
    cooling said individual shaped elements to a temperature below the sol-gel transition temperature to form gelled shaped elements; and
    forming a cross-link exterior surface on said gelled shaped elements by exposing the exterior of said gelled shaped elements to a tanning agent chosen from the group consisting of formaldehyde, aluminum acetate and mixtures of formaldehyde and aluminum sulfate at a temperature in the range of about 32°F. to about 70°F. for a time sufficient to produce toughened proteinaceous fish bait wherein said cross-linked exterior surface is capable of withstanding exposure to a temperature of 140°F. for two hours without blocking, said toughened proteinaceous fish bait having a relatively water insoluble exterior surface surrounding a relatively noncross-linked gelatinous body have a substantially higher solubility in water than said exterior surface.

4. The process of claim 3 wherein a humectant is added to the mixture of gel-forming proteinaceous matter and water.

5. The process of claim 3 and the further step of exposing said toughened proteinaceous fish bait to an aqueous environment whereby said shape is increased in size due to infusion of water by osmosis across said exterior surface.

6. The process of claim 3 wherein said individual shaped elements are formed by dropping discrete portions of said proteinaceous mass into a liquid maintained at a temperature below said sol-gel temperature, said liquid having a density less than that of said liquid proteinaceous mass.

7. The process of claim 6 wherein said discrete portions are deposited from a nozzle held motionless while said discrete portions are formed and dropped to said liquid.

8. The process of claim 6 wherein said discrete portions are dropped into said liquid so that sufficient distance is maintained between said discrete portions to prevent collisions therebetween prior to cooling below said sol-gel transition temperature.

9. The process of claim 3 wherein said homogeneous liquid proteinaceous mass contains waste sodium chloride brine from the natural salmon egg processing industry including therein dissolved and suspended quantities of salmon egg oil and other salmon egg constituents.

10. The process of claim 3 wherein said liquid proteinaceous mass contains milt.

11. The process of claim 3 wherein said liquid proteinaceous mass contains pulverized fish offal.

12. The process of claim 3 wherein said proteinaceous material is chosen from the group consisting of animal glue, fish glue, fish gelatin, partially hydrolyzed fish protein from fish skins, fish connective tissue, vegetable protein, egg albumin, soluble blood albumin, fish eggs, fish egg skeins and fish viscera.

13. The process of claim 3 wherein said proteinaceous material is animal glue having a gel strength of from about 85 to about 512 grams as measured by the Bloom Gelometer.

14. A fish bait comprising a nonhomogeneous formed shape of relatively noncross-linked, homogeneous water soluble proteinaceous matter having a sol-gel transition temperature of less than 140°F. surrounded by a cross-linked exterior surface formed by exposure of individual shaped elements consisting essentially of a homogeneous admixture of a gel-forming proteinaceous material and water to a tanning agent chosen from the group consisting of formaldehyde, aluminum acetate, and mixtures of formaldehyde and aluminum sulfate at a temperature below the blocking temperature of said water-soluble proteinaceous matter to cross-link the protein in the exterior of said shaped elements whereby said fish bait has an exterior surface having a lower solubility than said relatively noncross-linked water-soluble proteinaceous matter and is capable of withstanding exposure to a temperature of about 140°F. without blocking.

15. A fish bait comprising a nonhomogeneous formed shape of relatively noncross-linked, homogeneous water soluble proteinaceous matter having a sol-gel transition temperature of less than 140°F. surrounded by a cross-linked exterior surface formed by exposure of individual shaped elements consisting essentially of a homogeneous admixture of a gel-forming proteinaceous material and water to a tanning agent chosen from the group consisting of formaldehyde, aluminum acetate and mixtures of formaldehyde and aluminum sulfate at a temperature in the range of from about 32°F. to about 70°F. to cross-link the protein in the exterior of said shaped elements whereby said fish bait has an exterior surface having a lower solubility than said relatively noncross-linked water soluble proteinaceous matter and is capable of withstanding exposure to a temperature of about 140°F. without blocking.

16. The fish bait of claim 15 wherein said proteinaceous matter includes milt.

17. The fish bait of claim 15 having a pH in the range of 3 to 10.

18. The fish bait of claim 15 having a pH in the range of 5.5 to 6.5.

19. The fish bait of claim 15 wherein said proteinaceous matter includes pulverized fish eggs.

20. The fish bait of claim 15 wherein said proteinaceous matter is chosen from the group consisting of animal glue, fish glue, fish gelatin, partially hydrolyzed fish protein from fish skins, fish connective tissue, vegetable protein, egg albumen, soluble blood albumen, fish eggs, fish egg skeins, and fish viscera.

21. The fish bait of claim 15 wherein said gelled proteinaceous matter contains a humectant chosen from the group consisting of water-protein mixture miscible glycols which are derivatives of ethylene oxide or propylene oxide.

22. The fish bait of claim 15 wherein said gel-forming proteinaceous material contains waste sodium chloride brine from the natural salmon egg processing industry including therein dissolved and suspended quantities of salmon egg oil and other salmon egg constituents.

23. The fish bait of claim 15 wherein said proteinaceous matter is animal glue having a gel strength of from about 85 to about 512 grams as measured by the Bloom Gelometer.

* * * * *